United States Patent
Gajda et al.

(10) Patent No.: US 6,304,871 B1
(45) Date of Patent: Oct. 16, 2001

(54) METHOD AND SYSTEM FOR CHARACTERIZING APPLICATIONS FOR USE WITH DATABASES HAVING STRUCTURED QUERY LANGUAGE INTERFACES

(75) Inventors: Kimberly Lynn Gajda; Michael Joseph Johnson, both of Raleigh; Robert Tod Thorpe, Cary, all of NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/216,613

(22) Filed: Dec. 18, 1998

(51) Int. Cl.[7] .................................................. G06F 17/30
(52) U.S. Cl. .................................. 707/4; 707/5; 707/102
(58) Field of Search .............................. 707/2, 204, 103, 707/4, 5, 102; 345/355

(56) References Cited

U.S. PATENT DOCUMENTS

| | | | |
|---|---|---|---|
| 5,412,806 | * | 5/1995 | Du et al. .................................. 707/2 |
| 5,694,591 | * | 12/1997 | Du et al. .................................. 707/2 |
| 5,767,854 | * | 6/1998 | Anwar .................................... 345/355 |
| 5,897,634 | * | 4/1999 | Attaluri et al. ........................... 707/8 |
| 5,911,075 | * | 6/1999 | Glaser et al. ........................ 395/704 |
| 5,937,415 | * | 8/1999 | Sheffield et al. ..................... 707/204 |
| 6,073,129 | * | 6/2000 | Levine et al. .............................. 707/4 |
| 6,101,502 | * | 8/2000 | Heubner et al. ..................... 707/103 |

* cited by examiner

*Primary Examiner*—Thomas Black
*Assistant Examiner*—Charles L. Rones
(74) *Attorney, Agent, or Firm*—Sawyer Law Group, LLP; John D. Flynn; J. Bruce Schelkopf

(57) ABSTRACT

A system and method for allowing a user to characterize an application are disclosed. In one aspect, the method and system allow a user to characterize a database engine. The database engine utilizes a particular interface for communicating with an application. The method and system include determining a query spectrum including plurality of queries corresponding to a plurality of query types. The plurality of query types are chosen such that any possible query can be classified as being of one query type. The plurality of queries is compatible with the particular interface. The method and system include running the query spectrum on the database engine and determining a time taken to run each of the plurality of queries on the database engine. In another aspect, the method and system are for characterizing the application. In this aspect, the method and system include characterizing the database engine using a query spectrum including a first plurality of queries compatible with the particular interface. The first plurality of queries has a plurality of query types. The method and system further include providing a second plurality of queries characteristic of the application. The second plurality of queries have a portion of the plurality of query types and are compatible with the particular interface. The method and system further include calculating a run time taken to run the second plurality of queries on a portion of the plurality of database engines based on the portion of the plurality of query types and characterization of the plurality of database engines.

16 Claims, 7 Drawing Sheets

METHOD AND SYSTEM FOR CHARACTERIZING APPLICATIONS FOR USE WITH DATABASES HAVING STRUCTURED QUERY LANGUAGE INTERFACES

FIELD OF THE INVENTION

The present invention relates to applications which use database engines, particularly relational database engines, and more particularly to a method and system for rapidly and easily characterizing these applications across a wide range of database engines, database sizes, and machines.

BACKGROUND OF THE INVENTION

Database engines allow users to access data stored in databases. Some database engines allow information to be stored in a relational database. A relational database typically contains information that can be stored, accessed, and manipulated by a key or a combination of keys. Typically, database engines providing relational databases can be utilized by a variety of applications.

Structured query language (SQL) is typically used for communication between database engines providing relational databases and applications. In order to facilitate their use, a database engine typically provides an interface for communication with applications. The interface allows SQL queries to invoke the functions of the database engine. To use the database engine, applications provide SQL queries to the interface. The database engine then performs the operations in the queries on the relational database. Thus, SQL queries provide a standard mechanism for storing, manipulating, retrieving, and otherwise utilizing data based on a variety of keys.

The database engine and application are used within a computer system having particular machinery. For example, the computer system could include a network having a particular server on which the database engine, database, and application reside. Users at workstations access information in the database through the application and the database engine. The application can be a generic, readily available application or an application that has previously been customized for the users.

When designing the computer system, it must be ensured that the database engine and machinery provided can be adequately used with the application and the database holding the information the application is accessing. Typically, the time that it takes to perform a task depends on the database engine, the application, the machinery used and the size of the database. Thus, it must be ensured that for a database of a particular size, the application can use the database engine on the machinery to perform the desired tasks within a desired amount of time.

In order to ensure that the database engine and application can adequately function on the machinery for a database of a given size, benchmarks are typically used. Benchmarks are standard programs which can be run on a variety of database engines. Typically, the benchmarks are run so that they access database engines on a variety of machines at different database sizes. The time taken for the benchmarks to perform various tasks using each of the database engines on each of the machines can then be used to determine which machinery and which database engines are suitable for the computer system. Once this is determined, other factors, such as cost, can also be taken into account and the computer system provided to the users.

Although benchmarks provide a mechanism for selecting database engines and machinery, benchmarks do not account for differences in the applications to be used on the computer system. The benchmarks are standard programs that may behave very differently from the applications to be used on the computer system. Thus, benchmarks may not be able to adequately predict the behavior of the database engines and machinery considered. As a result, a non-optimal database engine or non-optimal machinery may be selected.

The inability of benchmarks to properly account for differences in applications can be addressed by running each application using a variety of database engines, at a variety of database sizes, on several machines. However, a customer may have several applications desired to be used. There is a relatively large number of database engines currently available. Characterizing each application with each database engine using different database sizes on different machinery is extremely time consuming and, therefore, expensive.

Accordingly, what is needed is a system and method for more efficiently characterizing applications or database engines, allowing for selection of the database engine and machinery. The present invention addresses such a need.

SUMMARY OF THE INVENTION

The present invention provides a system and method for allowing a user to characterize an application. In one aspect, the method and system allow a user to characterize a database engine. The database engine utilizes a particular interface for communicating with an application. The method and system comprise determining a query spectrum including plurality of queries. The plurality of queries corresponds to a plurality of query types. The plurality of query types are chosen such that any possible query can be classified as being of one query type. The plurality of queries is compatible with the particular interface. The method and system further comprise running the query spectrum on the database engine and determining a time taken to run each of the plurality of queries on the database engine. In another aspect, the method and system are for characterizing the application. In this aspect, the method and system comprise characterizing the database engine using a query spectrum including a first plurality of queries. The first plurality of queries is compatible with the particular interface. The first plurality of queries has a plurality of query types. The method and system further comprise providing a second plurality of queries characteristic of the application. The second plurality of queries have a portion of the plurality of query types and are compatible with the particular interface. The method and system further comprise calculating a run time taken to run the second plurality of queries on a portion of the plurality of database engines based on the portion of the plurality of query types and characterization of the plurality of database engines.

According to the system and method disclosed herein, the present invention allows for faster, simpler characterization of applications, thereby facilitating choosing solutions for a use's computing needs.

DETAILED DESCRIPTION OF THE INVENTION

The present invention relates to an improvement in characterizing applications which use database engines. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

Figure 1A:
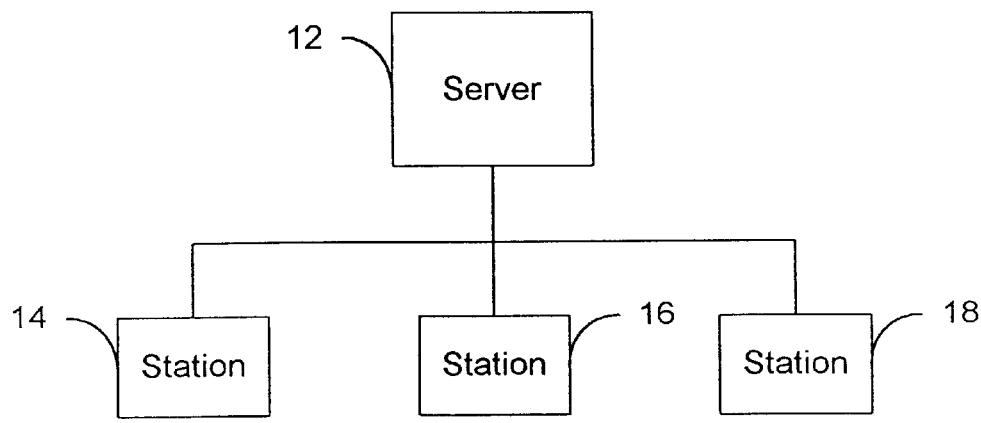
FIG. 1A (prior art) is a block diagram of one conventional computer system.
Figure 1B:
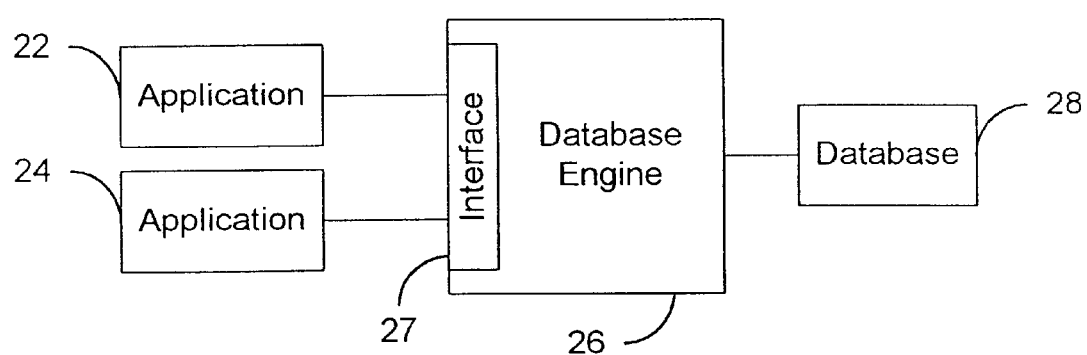
FIG. 1B (prior art) is a block diagram of a conventional system for using a relational database.

FIGS. 1A and 1B are block diagrams of a computer system 10 and software 20, respectively. The software 20 is used on the computer system 10. The computer system 10 includes a server 12 and network stations 14, 16, and 18. The software 20 includes applications 22 and 24, a database engine 26, and a database 28. The database 28 may be a relational database. The database engine 26 includes an interface 27, such as an open database connectivity (ODBC) interface. The applications 22 and 24 communicate with the database engine 26 through the interface 27. The applications 22 and 24 use queries that are compatible with the interface. Typically, the applications 22 and 24 use structured query language (SQL) queries to communicate via the interface 27. Throughout this document, the terms "query" and "queries" are used in a broad sense to denote SQL SELECT, INSERT, UPDATE, and DELETE instructions.

The system 10 and the software 20 should be selected to function as desired by the users. In order for the system 10 and software 20 to meet the requirements of users, the software 20 and system 10 must be properly integrated. Selection of the machinery in the system 10 and software 20 takes into account several factors. The operation of the software 20 in the system 10 depends upon the applications 22 and 24 being run, the database engine 26, the size of the database 28, and the machinery, such as the server 12 or the workstations 14, 16, and 18, used in the system 10. Typically, the applications 22 and 24 are selected by the user of the system 10. The size of the database 28 may also depend on the users' needs. Thus, the selection of the database engine 26 and machinery used in conjunction with the applications 22 and 24 can be made when the system 10 and software 20 are put together. Selection of the database engine 26 and the machinery should take into account the applications 22 and 24 used, the size of the database 28, the operation of the database engine 26, and the machinery on which the software 20 operates.

The applications 22 and 24 communicate with the database engine 26 using SQL queries (not shown). Each database engine 26 may take a different time to execute a particular SQL query because of the way in which a developer chose to implement the database engine 26 and the interface 27. The time taken to process a request also depends upon the SQL queries in the request. Thus, the time the database engine 26 takes to process the SQL queries provided by the applications 22 and 24 depends on the particular SQL queries each application 22 or 24 provides. Furthermore, the time to run some SQL queries may be highly dependent on the size of the database 28, while the time to run other SQL queries may be insensitive to the size of the database 28. Thus, the ability of the database engine 26 to process a particular SQL query may depend on the size of the database 28. In addition, characteristics of the machinery can affect the time to process an SQL query. For example, the speed of the processing unit (not shown) of the server 12 running the database engine 26 or the number and type of disks (not shown) used by the server 12 to store data affect the speed at which the database engine 26 can process an SQL query. The database engine 26 and machinery of the system 10 should be selected in order to ensure that the software 20 and the system 10 operate as desired at the database 28 sizes which may be used. In other words, the database engine 26 and machinery of the system 10 should be selected to ensure that operations performed by the applications 22 and 24 can be processed within a certain amount of time.

For example, the application 24 may typically produce SQL queries which are very complex and require a large amount of time to run on the database 28 of a particular size. The application 22 may typically produce SQL queries which are simple and can be quickly run on the database 28 of the particular size. The users may desire that tasks performed by either application 22 or 24, such as the generation of reports, take no more than three minutes. For example, then, the database engine 26 and machinery should be chosen so that the SQL queries from the application 24 can be processed by the database engine 28 within three minutes.

Figure 2A:
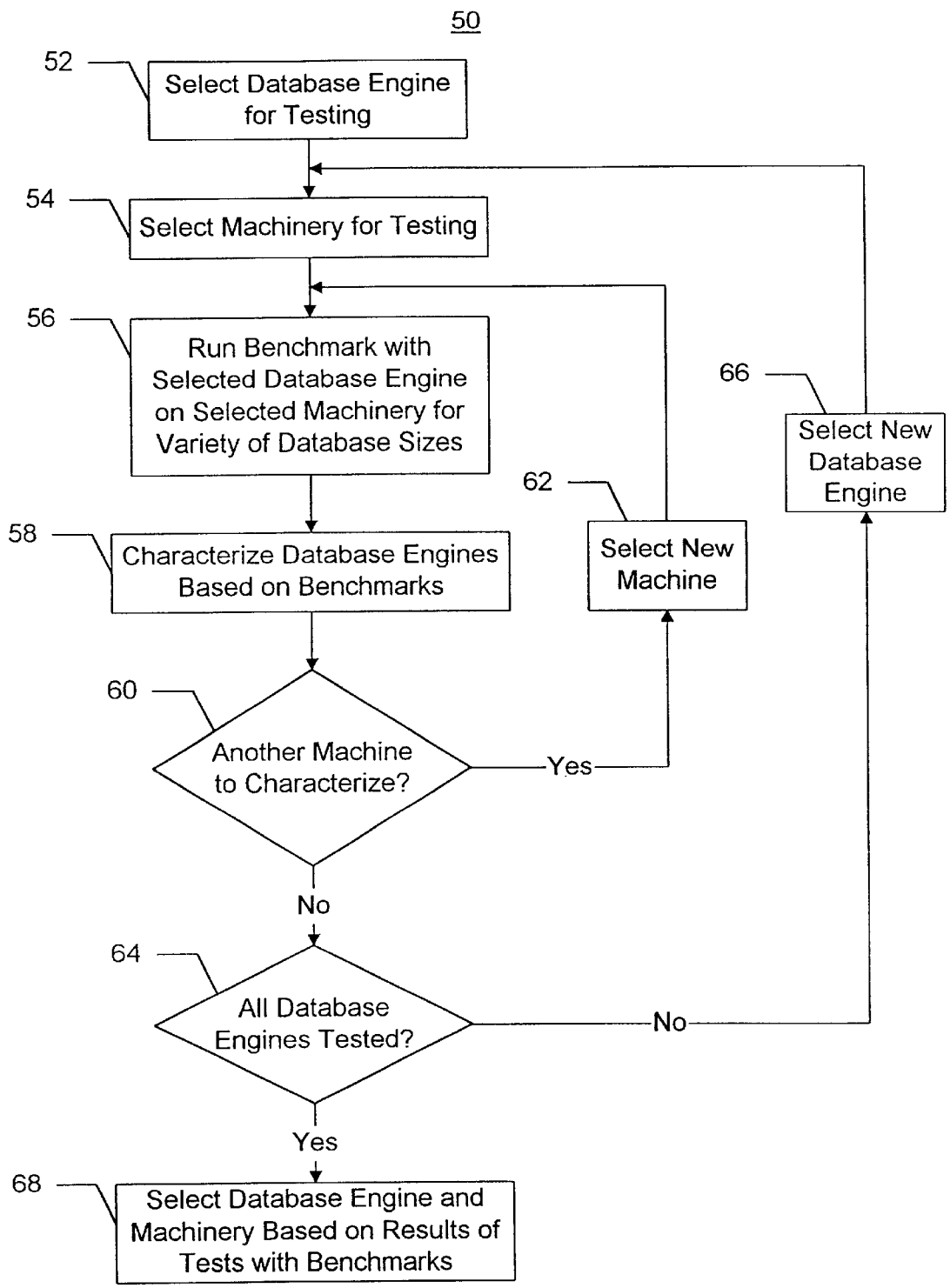
FIG. 2A (prior art) is a flow chart depicting a conventional method for providing a computer system.

FIG. 2A depicts a flow chart of a conventional method 50 for selecting the database engine 26 and machinery. A current database engine 26 is selected for testing, via step 52. Current machinery on which the current database engine 26 is to be tested is selected, via step 54. A benchmark (not shown in FIG. 1A or 1B) using the database engine 26 is then run for a s variety of database 26 sizes, via step 56. A benchmark is a standardized program including a set of SQL queries which are provided to the database engine 26. Via step 58, the current database engine 26 is characterized for the current machinery based on the time taken to run the benchmark at each database 28 size. It is then determined whether there are other machines with which the current database engine 26 is to be tested, via step 60. If there are other machines, then via step 62 a new machine is selected as the current machine and step 56 is returned to. If there is no other machinery remaining to be tested with the current database engine 26, then it is determined via step 64 whether all of the database engines 26 desired to be tested have been tested. If not all of the database engines 26 have been tested, then a new database engine 26 is selected as the current database engine, via step 66, and step 54 is returned to. If however, all desired database engines 26 have been run with all desired database 28 sizes and all desired machinery, then the database engine 26 and machinery are selected for the software 20 and system 10, respectively, via step 68.

Although the method 50 functions, one of ordinary skill in the art will readily recognize that the applications 22 and 24 may perform very differently from the benchmarks. This is particularly true of applications 22 and 24 which have been highly customized for a particular user. Thus, characterization of database engines 26 using benchmarks may not be sufficient for adequate selection of the database engine 26 and machinery. For example, suppose that the SQL queries typically produced by at least one of the applications 22 and 24 are much simpler than and can be processed faster than the SQL queries produced by the benchmark. As a result, the database engine 26 and machinery selected using the benchmarks may be much more sophisticated than required. Although performance may not suffer, the database engine 26 and machinery selected may be much more expensive than required. Consequently, the selection is not optimal. The situation is worse if the SQL queries typically produced by at least one of the applications 22 and 24 are much more complex than and are processed slower than the SQL queries produced by the benchmark. In this case, the database engine 26 and machinery selected may not function adequately with at least one of the applications 22 and 24. Thus, the selection is not optimal.

Figure 2B:
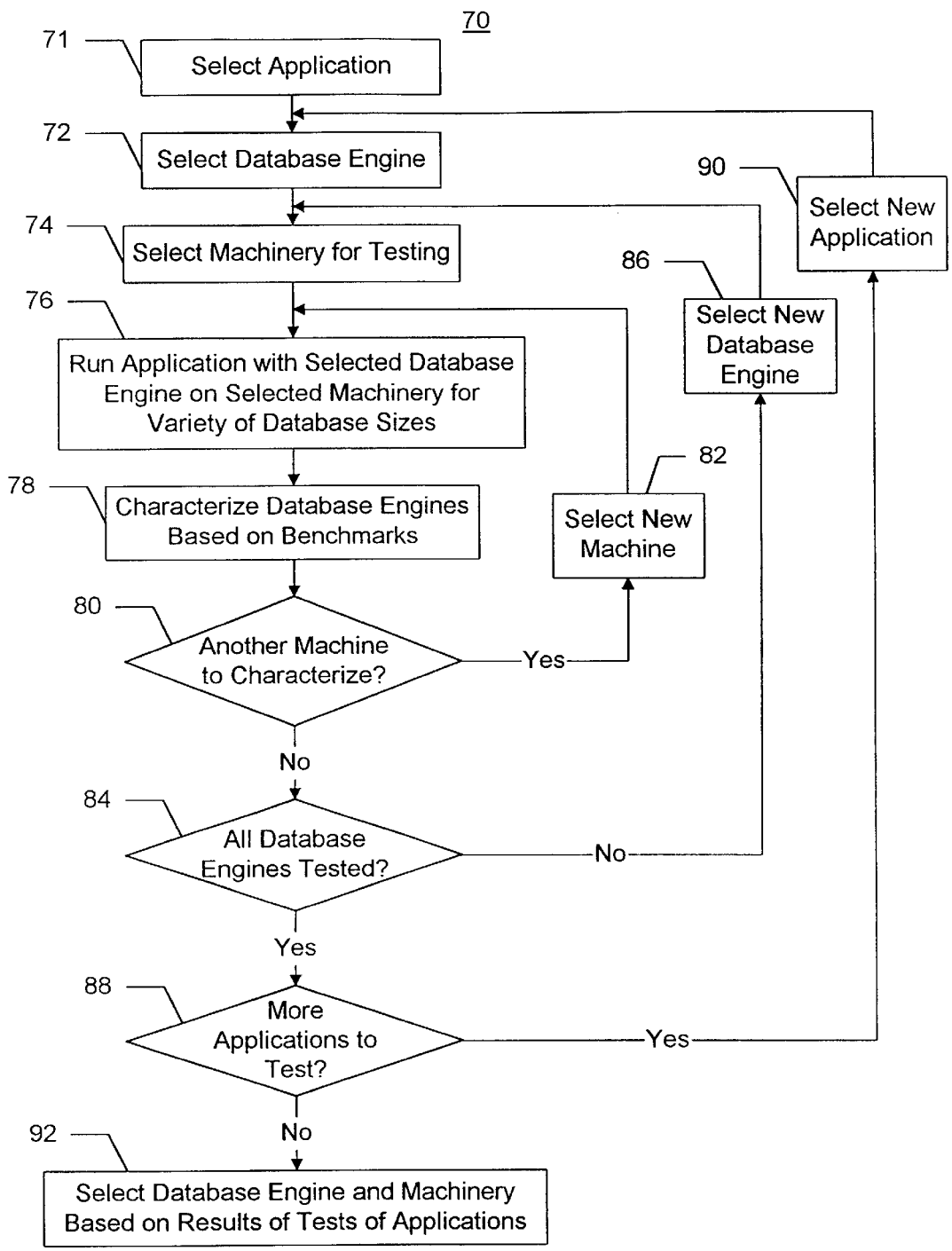
FIG. 2B (prior art) is a flow chart depicting a second conventional method for providing a computer system.

FIG. 2B depicts another conventional method 70 for selecting a database engine 26 and machinery that addresses some of the problems in using benchmarks. The method 70 tests the applications 22 and 24 that will be used in the computer system 10. An application 22 or 24 to be used in the system 10 is selected in step 71. Steps 72 through 86 are analogous to steps 52 through 66, respectively, of the method 50. However, in steps 72 through 86, an application 22 or 24 is tested in lieu of a benchmark. Once it is determined in step 84 that all database engines have been characterized for a given application 22 or 24, it is determined whether there are additional applications 22 and 24 to test, via step 88. If so, then the next application 22 or 24 is selected for testing, via step 90. Steps 72 through 86 are then repeated for the next application 22 or 24 being tested. If it is determined that all of the applications 22 and 24 have been tested, then the database engine 26 and the machinery are selected based on the results of the testing, via step 92.

Although the method 70 theoretically can be used, one of ordinary skill in the art will readily realize that the method 70 is extremely time consuming. A user may have many applications 22 and 24 to be used with the database engine 26 that is finally selected. There is a large number of database engines 26 currently available. For example, IBM, ORACLE, INFORMIX, and MICROSOFT all provide database engines. Characterizing each of application 22 and 24 with each database engine 26 using different database 28 sizes on different machinery is extremely time consuming. This is added to the cost of selecting the database engine 26 and machinery. Consequently, characterizing each application 22 and 24 with different database engines 25, different machinery, and different database 28 sizes merely introduces new problems into integration of the system 10 and software 20.

The present invention provides a system and method for allowing a user to characterize an application. In one aspect, the method and system allow a user to characterize a database engine. The database engine utilizes a particular interface for communicating with an application. The method and system comprise determining a query spectrum including a plurality of queries. The plurality of queries corresponds to a plurality of query types. The plurality of queries is compatible with the particular interface. The method and system further comprise running the query spectrum on the database engine and determining a run time taken to run each of the plurality of queries on the database engine. This process is repeated for a variety of database sizes. In another aspect, the method and system are for characterizing the application. In this aspect, the method and system comprise characterizing the database engine using a query spectrum including a first plurality of queries. The first plurality of queries is compatible with the particular interface. The first plurality of queries has a plurality of query types. The method and system further comprise providing or measuring a second plurality of queries characteristic of the application. The second plurality of queries have a portion of the plurality of query types and are compatible with the particular interface. The method and system further comprise calculating a time taken to run he second plurality of queries on a portion of the plurality of database engines based on the portion of the plurality of query types and characterization of the plurality of database engines.

The present invention will be described in terms of a database using an SQL interface for communicating with an application. However, one of ordinary skill in the art will readily recognize that this method and system will operate effectively for other types of interfaces with applications. The present invention will also be described in terms of a particular system, such as a network. However, one of ordinary skill in the art will readily realize that the method and system can operate effectively for other computer systems using other machinery.

Figure 3:
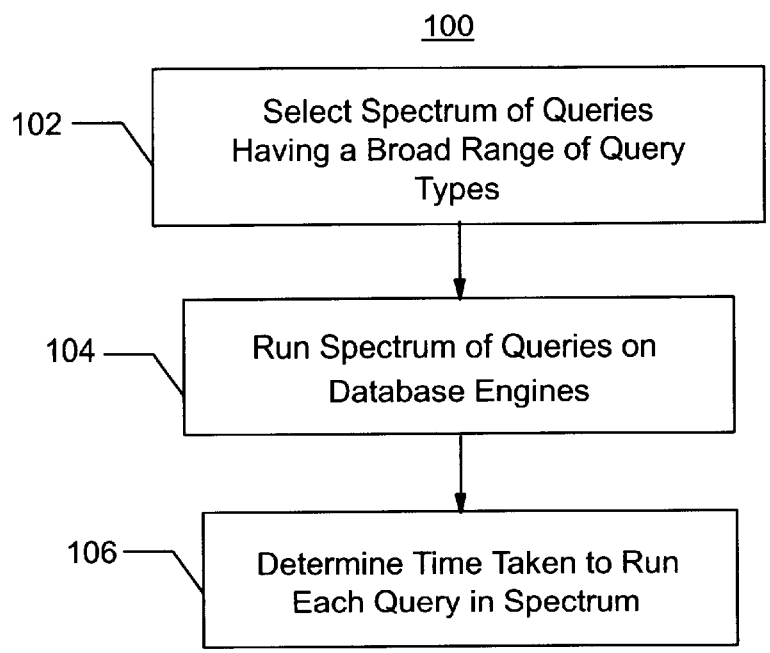
FIG. 3 is a flow chart depicting a method for characterizing a database engine in accordance with the present invention.

To more particularly illustrate the method and system in accordance with the present invention, refer now to FIG. 3 depicting a flow chart of one embodiment of a method 100 for characterizing a database engine 26. A spectrum of SQL queries is selected, via step 102. SQL queries can be grouped into query types based on the nature and complexity of the query. For example, query types can include deletes, inserts, joins, updates, and selects of only those rows which meet specified criteria. Note that, for example, different deletes or different joins may be considered different query types. A simple query type, such as a delete of one row having an index equal to a given value, can be run quickly by a database engine 26. A complex query such as an equijoin (a type of join) typically takes a longer time to run. The spectrum of SQL queries selected in step 102 includes SQL queries having a range of types, from simple to complex. In one embodiment, the SQL queries selected in step 102 includes several different deletes, several different inserts, several different joins, several different updates, and several different selects. However, another spectrum of SQL queries which encompasses a range of query types may be used. In a preferred embodiment, step 102 includes selecting the range of queries so that every possible SQL can be classified as being of exactly one query type. The SQL queries in the spectrum are then run on the database engines 26, via step 104. For each of the database engines 26 tested, the time to run each of the SQL queries in the spectrum is determined, via step 106.

Figure 4:
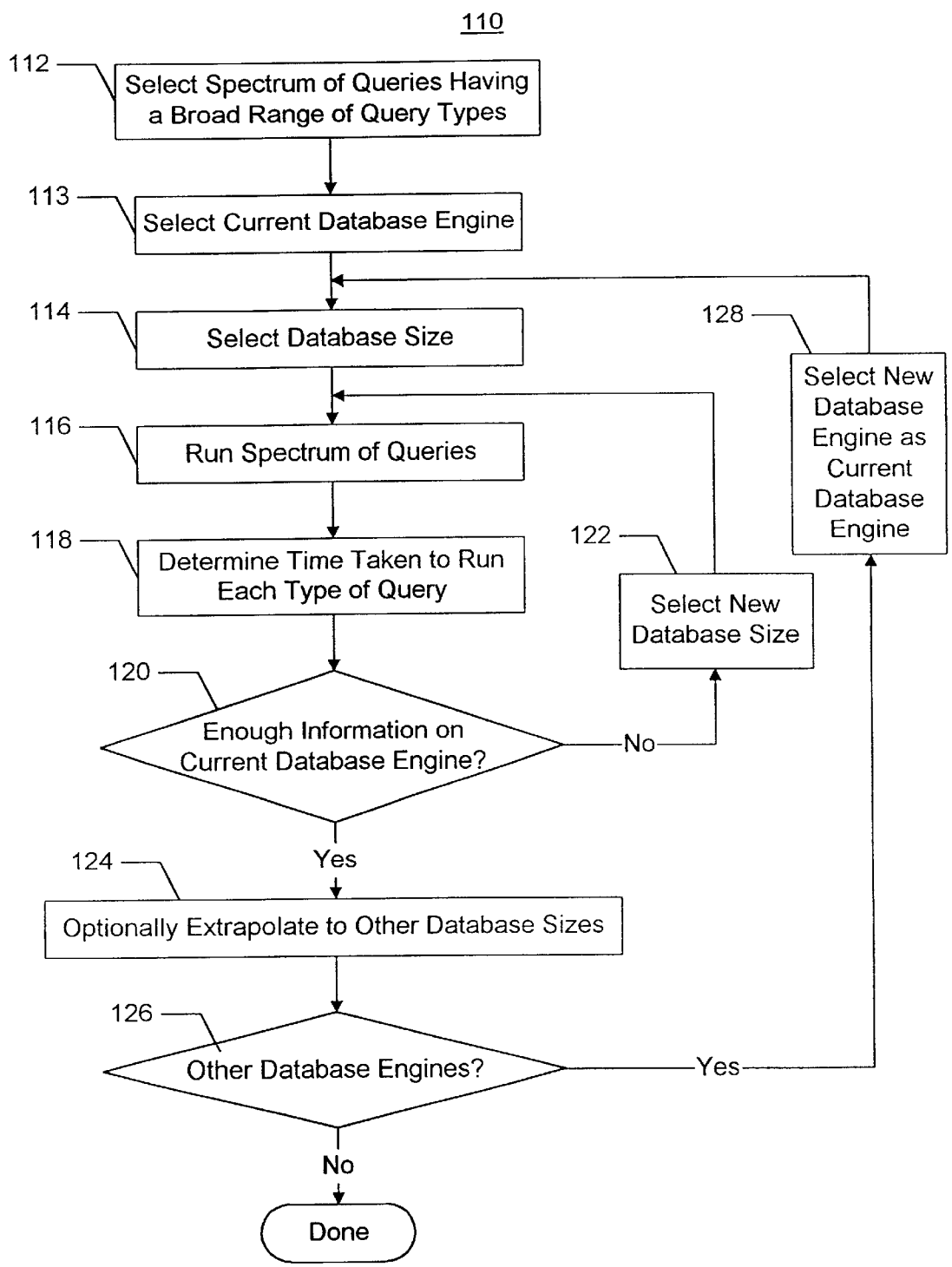
FIG. 4 is a more detailed flow chart depicting a preferred embodiment of a method for characterizing a database engine in accordance with the present invention.

FIG. 4 depicts a more detailed flow chart of a preferred embodiment of a method 110 for characterizing database engines 26. The spectrum of SQL queries is selected, via step 112. Step 112 is analogous to step 102. Consequently, the spectrum of SQL queries should cover a broad range of query types, from simple to complex. Preferably, each possible SQL query can be classified as being of exactly one query type. A database engine 26 is selected as the current database engine being characterized, via step 13. A current size of the database 28 is then selected, via step 114. Step 114 allows the database engine 26 to be characterized for a variety of sizes of the database 28. The SQL query spectrum is then run on current database engine at the current size of the database 28, via step 116. The time taken to run each SQL query in the spectrum and, therefore, the time to run each type of SQL query is determined in step 118. It is then determined if there is sufficient information on the current database, via step 120. In one embodiment, step 120 includes determining if the current database engine has been tested at the desired sizes of the database 28.

If it is determined in step 120 that sufficient information has not been obtained, then another size is selected as the current size of the database 28, via step 122. Steps 116 through 120 are then repeated. When it is determined in step 120 that sufficient information has been obtained, then the characterization of the current database engine is optionally extrapolated to other sizes of the database 28 that have not been explicitly tested, via step 124. Such extrapolation may typically be implemented by using linear regression analysis to select the best additive combination of several candidate functions of the input variables such as number of rows in the database tables and number of rows in the result set, etc. It is then determined if there are other database engines 26 to be characterized, via step 126. If so, then another database engine 26 is selected as the current database engine, via step 128. Steps 114 through 126 are then repeated. If it is determined that no other database engines 26 are to be characterized, then the method 110 is completed.

The time taken to run each SQL query type on a database engine 26 at a particular size of the database 28 characterizes the database engine 26. Because a range of queries are run on each database engine 26 tested, it can be determined how long the database engines 26 tested will take to run SQL queries of the types tested in the method 100 or 110. Thus, the behavior of the database engine 26 for a range of simple to complex query types has been determined. Moreover, the time taken to run a query type can be determined at a variety of sizes of the database 28. Thus, the database engines 26 can be characterized at a variety of database 28 sizes using the method 110. As discussed above, there are four variables in integrating the system 10 and the software 20. These variables are the database engine 26 used, the size of the database 28, the applications 22 and 24 used, and the machinery used. Two of the variables, database engine 26 and database 28 size, can be well characterized using the method 100 or 110. The possible database engines 26 used typically do not vary between users. Once the method 100 or 110 has been performed, only accounting for the machinery and the applications 22 and 24 remains. Thus, the methods 100 or 110 need not be performed each time a system 10 is to be integrated with software 20. Instead, the information gleaned through the methods 100 and 110 can be used once the method 100 or 110 has been performed for the database engines 26 and database 28 sizes that may be of interest.

Figure 5:
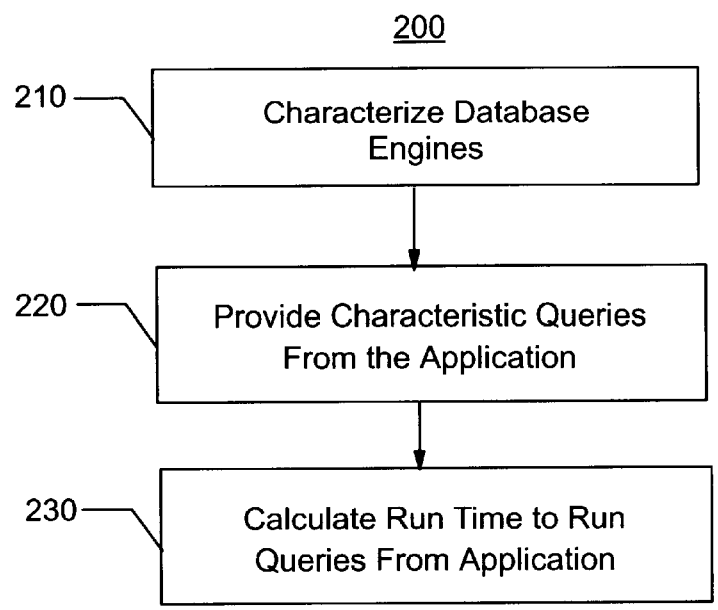
FIG. 5 is a flow chart depicting a method for determining characteristic run times for an application in accordance with the present invention.

FIG. 5 depicts a flow chart of a method 200 for determining characteristic run times of the applications 22 and 24. Thus, the method 200 can be used to characterize the applications 22 or 24. The database engines 26 are characterized, via step 210. The database engines 26 characterized in step 210 are those database engines 26 with which the applications 22 or 24 may be used. In a preferred embodiment, step 210 is performed using the method 110. SQL queries characteristic of the applications 22 or 24 are provided, via step 220. The characteristic SQL queries provided in step 220 should correspond to the types of SQL queries typically generated by the applications 22 or 24 during use. Typically database engines provide a trace mechanism which can be used to facilitate the gathering of such representative query types. The time taken to run the characteristic SQL queries using the database engines 26 is then calculated using the characterization of the database engines 26, via step 230. Because the time taken to run the characteristic SQL queries on the database engines 26 is calculated, it can be determined how long the applications 22 and 24 will generally take to perform the desired tasks. Thus, after machine differences are accounted for, it can be determined which database engine 26 and machinery to select.

Figure 6:
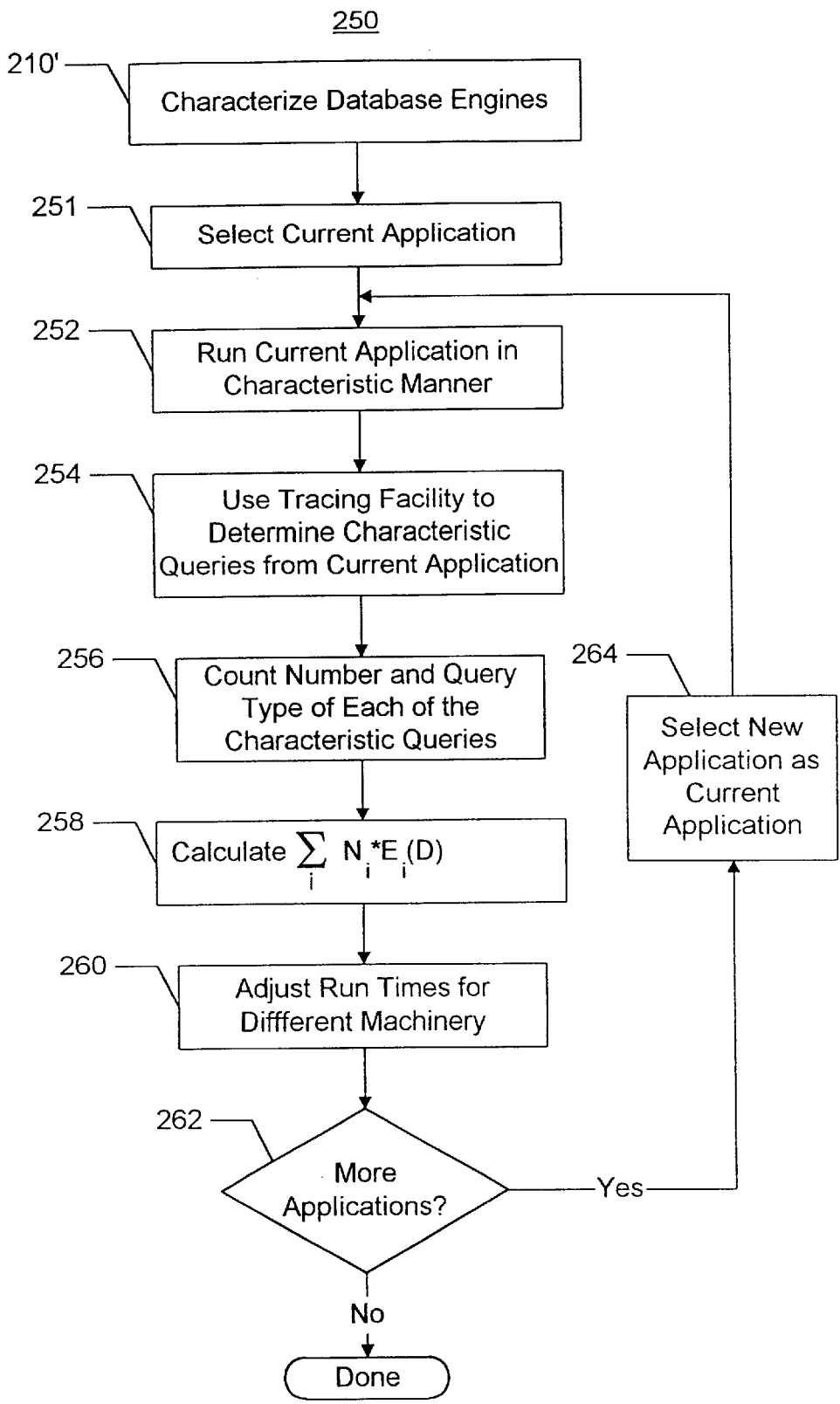
FIG. 6 depicts a more detailed flow chart of a preferred embodiment of a method for determining the characteristic run times of the applications.

FIG. 6 depicts a more detailed flow chart of a preferred embodiment of a method 250 for determining the characteristic run times of the applications 22 and 24. The database engines 26 are characterized, via step 210'. The database engines 26 characterized in step 210' are those database engines 26 with which the applications 22 or 24 may be used. In a preferred embodiment, step 210' is performed using the method 110. Thus, step 210' characterizes the database engines using a spectrum of SQL queries having a range of SQL query types. There is at least one query from each query type in the chosen SQL spectrum.

A current application of the applications 22 and 24 is then selected, via step 251. The current application is then run in a characteristic way, via step 252. In a preferred embodiment, step 252 includes performing characteristic tasks using the current application. For example, presume application 24 is the current application. If the application 24 is typically used to generate a report of employment information for a large number of employees, then in step 252 the application 24 is used in a similar manner. However, the actual information from the user, such as the employment information discussed above, need not be used in step 252. Instead, other information contained in a test database (not shown) may be used.

Because the application 22 or 24 is used in a characteristic way in step 252, characteristic SQL queries are generated during step 252. These characteristic SQL queries are obtained, via step 254. In a preferred embodiment, step 254 is performed using a tracing facility (not shown) in a database engine 26 that the application 22 or 24 is using when the application 22 or 24 is run in step 252. Many database engines 26 include a tracing facility that indicates the SQL queries provided to the database engine 26. Turning on the tracing facility of the database engine 26 provides a list of the SQL queries. Consequently, step 254 preferably includes turning on the tracing facility of a database engine 26 which the current application is using when run in step 252. Note that steps 252 and 254 are analogous to step 220 of the method 200.

The SQL query type is determined for the SQL queries in the characteristic SQL queries, via step 256. The SQL possible query types are those used to characterize the database engine 26 in step 210'. Also in step 256 the number of SQL queries of each SQL query type for the characteristic SQL queries is determined in step 256. For example, suppose that the query types are deletes, inserts, joins, updates, and selects. The number of each of these query types in the characteristic SQL queries is determined in step 256. The total time taken to run the characteristic SQL query for the database engines 26 characterized in step 210' at different database sizes is then calculated, via step 258. In a preferred embodiment, step 258 includes multiplying the time taken to run an SQL query type by the number of the SQL query types for each SQL query type, and adding this quantity for each of the SQL query types in the characteristic SQL queries. For example, presume that i is one SQL query type of the SQL query types represented in the characteristic SQL queries. Also presume that $N_i$ is the number of characteristic SQL queries of that SQL query type, and $E_i(D)$ is time taken to run the SQL query type by a particular database engine 26 at a particular database 28 size D. Step 258 includes calculating the quantity:

$$t(D) = \sum_i N_i * E_i(D)$$

for each database 28 size D of interest. The quantity t(D) is the characteristic run time for a particular database engine 26 at the database 28 size D. Thus, after step 258 is performed, the characteristic run times are known for the current application and a particular machine. Differences due to the machinery are then accounted for in step 260. Step 260 includes adjusting the characteristic run times t(D) for different machines. Differences in machinery can be accounted for using benchmarks. Using benchmarks, a factor which represents the differences between machinery can be obtained. In a preferred embodiment, therefore, step 260 includes multiplying the characteristic run times t(D) by the factor to account for machine differences. Thus, the characteristic run times have been determined for the current application.

It is then determined whether there are more applications 22 and 24 to be characterized, via step 262. If so, then a new application is selected as the current application, via step 264. The steps 252 through 262 are then repeated. If the applications 22 and 24 of interest have been characterized, then the method 250 is completed.

Thus, the characteristic run times for the characteristic SQL queries generated by the applications 22 and 24 have been calculated for different database engines 26, database 28 sizes, and different machinery. The SQL queries are actually generated by the applications 22 and 24 of interest. Consequently, the characteristic times generated in the method 200 and 250 provide an accurate indication of how the applications 22 and 24 will function with different database engines 26, for different database 28 sizes, and for different machinery. Thus, the method 200 or 250 provides a more accurate description of the interaction between the applications 22 and 24, the database engine 26, the size of the database 28, and the machinery than the use of benchmarks alone. Moreover, it is noted that the step 210 or 210' of characterizing the database engine 26 need not be repeated for each application 22 or 24. Instead, the step 210 or 210' need be performed only once for each database engine 26 of interest. Thus, the method 200 or 250 is significantly faster and simpler than attempting to run the applications 22 and 24 on different database engines 26, different database 28 sizes, and different machinery.

Figure 7:
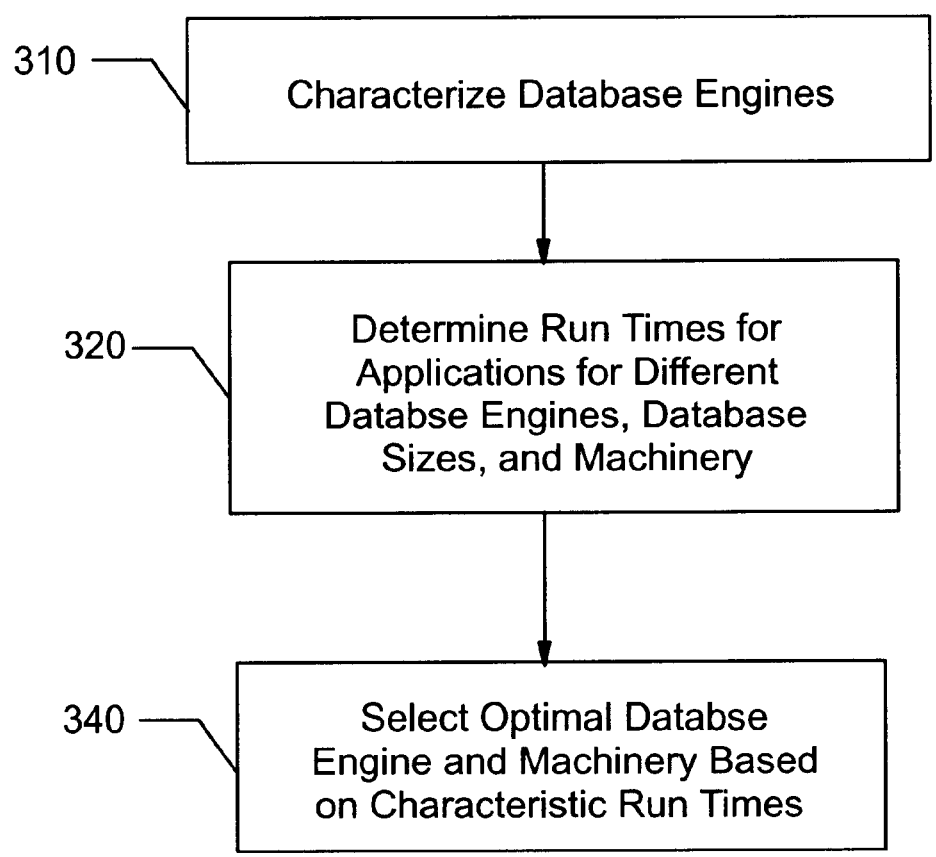
FIG. 7 is a flow chart depicting a method in accordance with the present invention for selecting a computer system.

FIG. 7 depicts a method 300 in accordance with the present invention for selecting a database engine 26 and machinery. The database engines 26 that may be of interest are characterized, via step 310. Step 310 is the same as steps 210 and 210'. The characteristic run times are determined for the applications of interest, via step 320. Steps 310 and 320 include the method 200 or the method 250. Based on the characteristic run times determined in step 320, the database engine 26 and machinery are selected, via step 340.

Because the characteristic run times determined in step 320 account for the actual applications 22 and 24 being used, the database engines 26 of interest, different database 28 sizes, and different machinery, the database engine 26 and machinery selected in step 340 is very likely to be an optimized solution. Thus, the database engine 26 and machinery selected in step 340 probably fulfill the users' needs without forcing the user to incur the extra cost of machinery or a database engine 26 that is significantly more powerful than required. The problems of using benchmarks only are, therefore, substantially eliminated. In addition, the method 300 consumes significantly less time and resources than attempting to run the applications 22 and 24 on all combinations of database engines 26, databases 28, and machinery that may be of interest. Thus, the method 300 allows the database engine 26 and machinery to be selected in a fast efficient manner.

A method and system has been disclosed for characterizing an application. Software written according to the present invention can be stored in some form of computer-readable medium, such as memory or CD-ROM, or transmitted over a network, and executed by a processor.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spit and scope of the appended claims.

What is claimed is:

1. A system for allowing a user to charcterize a database engine, the database engine utilizing a particular interface for communicating with an application, the system comprising:

a query spectrum including a plurality of queries, the plurality of queries corresponding to a plurality of query types chosen such that any possible query can be classified as being one query type, the plurality of queries including a plurality of joins, the plurality of query types including all possible join types for the plurality of joins, the plurality of queries being compatible with the particular interface, the plurality of query types being run on the database engine; and a plurality of times corresponding to the plurality of query types, the plurality of times corresponding to a time taken to run a query on the database engine.

2. The system of claim 1 wherein the database engine is capable of utilizing a plurality of databases, each of the plurality of databases having a size, and wherein the plurality of times further includes:

a particular time taken to run each of the plurality of queries for each of the plurality of databases.

3. The system of claim 2 wherein the plurality of query types is based on the time taken to run a particular query of the query type.

4. A method for allowing a user to characterize a database engine, the database engine utilizing a particular interface for communication with an application, the method comprising the steps of:

(a) determining a query spectrum including a plurality of queries, the plurality of queries corresponding to a plurality of query types chosen such that any possible query can be classified as being one query type, the plurality of queries including a plurality of joins, the plurality of query types including all possible join types for the plurality of joins, the plurality of queries being compatible with the particular interface;

(b) running the query spectrum on the database engine; and (c) determining a time taken to run each of the plurality of queries on the database engine.

5. The method of claim 4 wherein the database engine is capable of utilizing a plurality of databases, each of the plurality of databases having a size, and wherein the query spectrum running step (b) further includes the step of:

(b1) running the query spectrum on the database engine for each of the plurality of databases.

6. The method of claim 5 wherein the time determining step (c) fiter includes the step of:

(c1) determining a particular time taken to run each of the plurality of queries for each of the plurality of database.

7. A method for characterizing an application capable of being used with a database engine that utilizes a particular interface for communicating with the application, the method comprising the steps of:
  (a) characterizing the database engine using a query spectrum including a first plurality of queries, the first plurality of queries being compatible with the particular interface, the first plurality of queries having a plurality of query types, wherein a query type of the plurality of query types has a characteristic time based on a query time to run a query having the query type;
  (b) providing a second plurality of queries characteristic of the application, the second plurality of queries having a portion of the plurality of query types and being compatible with the particular interface; and
  (c) calculating a run time taken to run the second plurality of queries on a portion of the plurality of database engines based on the portion of the plurality of query types and characterization of the plurality of database engines; wherein the run time determining step (c) further includes the step of:
    (c1) for each of the portion of the plurality of query types, counting a number of the second plurality of queries having a particular query type;
    (c2) for each of the portion of the plurality of query types, taking the sum of the number multiplied by the characteristic time.

8. A method for characterizing an application capable of being used with a database engine that utilizes a particular interface for communicating with the application, the method comprising the steps of:
  (a) characterizing the database engine using a query spectrum including a first plurality of queries, the first plurality of queries being compatible with the particular interface, the first plurality of queries having a plurality of query types, wherein a query type of the plurality of query types has a characteristic time based on a query time to run a query having the query type;
  (b) providing a second plurality of queries characteristic of the application, the second plurality of queries having a portion of the plurality of query types and being compatible with the particular interface; and
  (c) calculating a run time taken to run the second plurality of queries on a portion of the plurality of database engines based on the portion of the plurality of query types and characterization of the plurality of database engines; wherein the database engine includes a tracing facility and wherein the step of providing the second plurality of queries (b) further includes the steps of:
    (b1) performing a plurality of characteristic tasks on the database engine; and
    (b2) using the tracing facility to determine the second plurality of queries.

9. A method for characterizing an application capable of being used with a database engine that utilizes a particular interface for communicating with the application, the method comprising the steps of:
  (a) characterizing the database engine using a query spectrum including a first plurality of queries, the first plurality of queries being compatible with the particular interface, the first plurality of queries having a plurality of query types, wherein a query type of the plurality of query types has a characteristic time based on a query time to run a query having the query type;
  (b) providing a second plurality of queries characteristic of the application, the second plurality of queries having a portion of the plurality of query types and being compatible with the particular interface; and
  (c) calculating a run time taken to run the second plurality of queries on a portion of the plurality of database engines based on the portion of the plurality of query types and characterization of the plurality of database engines; wherein the lun time determining step (c) further includes the step of:
    (c1) counting a number of the second plurality of queires having a particular query type for each of the portion of the plurality of query types;
    (c2) taking the sum of the number multiplied by the characteristic time for each of the portion of the plurality of query types.

10. A method for characterizing an application capable of being used with a database engine that utilizes a particular interface for communicating with the application, the method comprising the steps of:
  (a) characterizing the database engine using a query spectrum including a first plurality of queries chosen such that any possible query can be classified as being one query type, the plurality of queries including a plurality of joins, the plurality of query types including all possible join types for the plurality of joins, the first plurality of queries being compatible with the particular interface, the first plurality of queries having a plurality of query types, the plurality of query types being run on the database engine;
  (b) providing a second plurality of queries characteristic of the application, the second plurality of queries having a portion of the plurality of query types and being compatible with the particular interface; and
  (c) calculating a run time taken to run the second plurality of queries on a portion of the plurality of database engines based on the portion of the plurality of query types and characterization of the plurality of database engines.

11. The method of claim 10 wherein the database engine includes a tracing facility and wherein the step of providing the second plurality of queries (b) further includes the steps of:
  (b1) performing a plurality of characteristic tasks on the database engine; and
  (b2) using the tracing facility to determine the second plurality of queries.

12. The method of claim 10 wherein a query type of the plurality of query types has a characteristic time based on a query time to run a query having the query type.

13. The method of claim 12 wherein the database engine is capable of utilizing a plurality of databases, each of the plurality of databases having a size, and wherein the database characterization step (a) further includes the step of:
  (a1) running the query spectrum on the database engine for each of the plurality of databases.

14. The method of claim 13 wherein the run time determining step (c) further includes the step of:
  (c1) calculating a particular time taken to run the second plurality of queries on the database engine at a particular database size based on the portion of the plurality of queay types and the characterization of the database engine.

15. The method of claim 12 wherein the database engine can be run on a plurality of machines and wherein the run time determining step (c) further includes the step of:
  (c1) adjusting the run time to account for a portion of the plurality of the machines.

16. The method of claim 5 wherein the run time adjusting step (c1) further includes the step of:
  (c1i) adjusting the run time using a plurality of benchmarks corresponding to the portion of the plurality of machines.

* * * * *